United States Patent
Tanaka et al.

(10) Patent No.: US 6,841,495 B2
(45) Date of Patent: Jan. 11, 2005

(54) GLASS AND CONDUCTIVE PASTE USING THE SAME

(75) Inventors: Tetsuya Tanaka, Tokyo (JP); Kenji Morinaga, deceased, late of Chikushi-gun (JP); by Nobuko Morinaga, legal representative, Chikushi-gun (JP); by Yuko Koyama, legal representative, Chikushi-gun (JP); by Yoshiko Morinaga, legal representative, Chikushi-gun (JP); Mikio Yamazoe, Nishitokyo (JP); Megumi Kawahara, Akishima (JP)

(73) Assignee: Shoei Chemical Inc., Tokyo (JP)

(*) Notice: Subject to any disclaimer, the term of this patent is extended or adjusted under 35 U.S.C. 154(b) by 212 days.

(21) Appl. No.: 10/314,897

(22) Filed: Dec. 9, 2002

(65) Prior Publication Data

US 2003/0119653 A1 Jun. 26, 2003

(30) Foreign Application Priority Data

Dec. 21, 2001 (JP) ........................................ 2001-390611
Oct. 30, 2002 (JP) ........................................ 2002-316884

(51) Int. Cl.[7] ........................... C03C 3/066; C03C 8/18; H01B 1/14
(52) U.S. Cl. ........................... 501/79; 501/19; 501/26; 252/512; 252/513; 252/514; 252/519.52; 252/519.54
(58) Field of Search ............................. 501/19, 26, 79; 252/512, 513, 514, 519.52, 519.54

(56) References Cited

U.S. PATENT DOCUMENTS

| 3,902,102 | A | | 8/1975 | Burn | 361/305 |
|---|---|---|---|---|---|
| 4,451,869 | A | | 5/1984 | Sakabe et al. | 361/309 |
| 5,306,674 | A | * | 4/1994 | Ruderer et al. | 501/20 |
| 5,645,765 | A | * | 7/1997 | Asada et al. | 252/519.51 |
| 6,123,872 | A | * | 9/2000 | Yamazaki et al. | 252/301.6 R |

FOREIGN PATENT DOCUMENTS

| EP | 0 926 102 | 6/1999 |
|---|---|---|
| JP | 54-119513 | 9/1979 |
| JP | 59-184511 | 10/1984 |
| JP | 59-223248 | 12/1984 |
| JP | 1-51003 | 11/1989 |
| JP | 5-234415 | 9/1993 |
| JP | 5-342907 | 12/1993 |
| JP | 9-55118 | 2/1997 |
| RU | 1791405 | 1/1993 |

* cited by examiner

Primary Examiner—Karl Group
(74) Attorney, Agent, or Firm—Flynn, Thiel, Boutell & Tanis, P.C.

(57) ABSTRACT

A glass containing no lead and comprising, calculated as oxides: 40–60 wt. % ZnO, 15–35 wt. % $B_2O_3$, 1–16 wt. % $SiO_2$, 1–10 wt. % $Al_2O_3$, 2–15 wt. % $MnO_2$, and at least one selected from the group consisting of $Li_2O$, $Na_2O$ and $K_2O$ in their total of 0.5–10 wt. %, and a glass with the above-described components where a total of at least one selected from the group consisting of $Li_2O$, $Na_2O$ and $K_2O$ is 0–5 wt. %, and at least one selected from the group consisting of MgO, CaO, $TiO_2$, $Cr_2O_3$, $ZrO_2$, $Ta_2O_5$, $SnO_2$, and $Fe_2O_3$ is further included in their total of 0.1–5 wt. %. A conductive paste using such a glass as an inorganic binder has a superior binder removal ability and a good sinterability and can form dense conductors with excellent characteristics with respect to resistance to plating solutions, adhesive strength, resistance to thermal shocks, etc.

14 Claims, No Drawings

GLASS AND CONDUCTIVE PASTE USING THE SAME

BACKGROUND OF THE INVENTION

1. Field of the Invention

The present invention relates to a conductive paste suitable for forming electrodes of electronic components and conductors of thick-film circuits and to a glass used therein. More particularly, the present invention relates to a conductive paste that can be fired even in a non-oxidizing atmosphere and is suitable for forming terminal electrodes of multilayer ceramic components using a base metal such as nickel or copper for inner electrodes and to a glass used therein.

2. Description of the Prior Art

Multilayer ceramic components such as multilayer capacitors, multilayer inductors, and the like are typically fabricated in the manner as follows. Unfired (green) ceramic sheets, for example, of a dielectric or magnetic material are alternately laminated with a plurality of inner electrode paste layers to obtain a non-fired laminate. Then, the laminate is cut and fired at a high temperature to obtain a ceramic body (referred to as "ceramic body" hereinbelow). Thereafter, a conductive paste in which a conductive powder and an inorganic binder powder such as glass and the like is dispersed, if necessary, together with other additives in a vehicle, is coated by any of a variety of methods such as dipping, brush coating, screen printing, and the like on the end surfaces of the inner electrodes exposed from the ceramic body, followed by drying. High-temperature firing is then conducted to form terminal electrodes electrically connected to the inner electrodes. Then, if necessary, a plated nickel layer or a plated layer of tin or alloy thereof is formed on the terminal electrodes.

Noble metals such as palladium, silver-palladium, platinum, and the like have been used as the inner electrode materials. But in recent years, base metals such as nickel, copper, and the like came into use in order to save natural resources, to reduce cost and also to prevent the occurrence of delamination and cracking caused by oxidation and expansion of palladium. As a result, conductive pastes of base metals such as nickel, cobalt, copper and the like, which can easily form good electric connection to those inner electrode materials are also used for the formation of terminal electrodes. Because those base metal electrodes are easily oxidized during firing, the firing has been conducted at a peak temperature of about 700–900° C. in a non-oxidizing atmosphere, for example, an inert gas atmosphere or a reducing atmosphere, such as nitrogen or hydrogen-nitrogen and the like.

A non-reducible glass which is stable even in firing under a non-oxidizing atmosphere has to be used as an inorganic binder for a conductive paste to be fired in the non-oxidizing atmosphere. A PbO component contained in lead-containing glass frits, which have been widely used for conductive pastes, is easily reduced. Moreover, because lead is hazardous to the human bodies and causes environmental pollution, a glass containing no lead is required.

Further, when a terminal electrode is electroplated, adhesive strength with the ceramic body is sometimes greatly decreased by an acidic electroplating solution that modifies and dissolves glass components and breaks the glass structure. Therefore, a glass is required which has not only a high adhesive strength, but also good resistance to acids so that the glass is not vulnerable to attack from acidic plating solutions.

Another problem is that because firing is conducted under an atmosphere with a small content of oxygen, organic components such as solvents and binder resins which are used as vehicles are difficult to oxidize and decompose. If sufficient burning, decomposition, removal (referred to as "binder removal" hereinbelow) are not conducted, the vehicle decomposition products are encapsulated in the film and/or partly become carbon and remain in the film. Those carbonaceous residues cause a variety of problems, such as preventing sintering, lowering the density of the resultant fired film due to pores formed by oxidation and gasification at a high temperature and decreasing the strength of the ceramics such as barium titanate constituting the ceramic body. The selection of inorganic binder is also important in terms of resolving these problems associated with binder removal.

Accordingly, a barium-containing glass and a zinc-containing glass have been comprehensively studied as a reduction-resistant glass which has a high adhesive strength with a substrate and makes it possible to provide conductors with excellent characteristics.

For example, base metal terminal electrodes of multilayer ceramic capacitors are known which use a reduction-resistant glass such as barium borate glass, barium zinc borate glass, barium zinc borosilicate glass, and the like (see U.S. Pat. No. 3,902,102). Furthermore, it is also known to use a copper paste for terminal electrodes comprising a barium borosilicate glass (see Japanese Patent Publication No. 5-234415), to use a copper paste for terminal electrodes comprising a zinc borosilicate glass of specific composition including alkali metal components and alkaline earth metal components (see Japanese Patent Publication No. 59-184511) and to use an aluminum strontium borosilicate glass for terminal electrodes (see Japanese Patent Publication No. 9-55118).

Further, there have been proposed a copper a paste for terminal electrodes using a zinc borosilicate glass (see Examined Japanese Patent Publication No. 1-51003), and a terminal electrode paste using a zinc borosilicate glass with a superior resistance to plating solutions (see Japanese Patent Publication No. 5-342907).

However, in recent years improvements on characteristics of terminal electrodes have been strongly required. Accordingly, those conventional glasses are not always fully satisfactory for terminal electrodes. In particular, although barium-containing glass has an advantage of low softening temperature so that it can be fired at low-temperatures even if lead is not contained therein, it does not have a sufficient resistance to plating solutions and permits permeation of plating solution occurring during electroplating which reduces the adhesive strength with the ceramic body, causes cracking and fracturing of the ceramic body, induces a decrease in insulation resistance, and reduces reliability of the resultant multilayer products. Another problem was that lumps or spots of glass (referred to as "glass spots" hereinbelow) locally appeared on the electrode surface preventing the formation of a uniform plated film and inhibiting soldering.

On the other hand, a zinc-containing crystallizable glass is generally known to form a reaction layer and thereby strongly adhere to the ceramic body and has excellent strength, thermal shock resistance, resistance to plating solutions, and resistance to water. However, such a glass typically has a high softening point. A problem associated with a zinc borate glass or a zinc borosilicate glass of specific composition with a low softening point is that it is difficult to obtain a uniform glass film from these glasses because they have a narrow range of vitrification and are susceptible to phase separation. Moreover, because they are crystallizable glasses, flow characteristics and crystallization behavior in the firing process are difficult to control. Yet another problem is that the temperature range in which firing can be conducted is narrow because of dependence on process conditions, in particular, because of significant variations in characteristics related to the firing atmosphere, firing temperature, and the like.

Further, some ceramic body is also known to decrease the electrode strength. Specifically, when the ceramic body is formed from a barium titanate ceramic dielectric with F characteristic specified by JIS (Japanese Industrial Standard) C6429 and C6422, which has a high dielectric constant, the zinc-containing crystallizable glass of the terminal reacts with the ceramic body in the interface zone therebetween, forming a homogeneous reaction layer, strongly adhering to the substrate and showing practically no deep permeation into the ceramic body. However, in the case of applications to a barium titanate ceramic dielectric with B characteristic specified by JIS, i.e., a flat capacity-temperature characteristic, glass components present in the terminal electrode that were melted during firing deeply permeate into the ceramic body, degrading the strength of the ceramic body. The ceramic body so degraded may be cracked or fractured when a stress causing the electrode film to peel off is applied to the capacitor, for example, in a peel strength test of terminal electrodes. As a result, the capacitor mounted on a circuit substrate or the like has poor reliability. This is apparently due to the difference in microstructure between the ceramics; ceramics with F characteristic have a relatively homogeneous structure, whereas ceramics with B characteristic has a heterogeneous structure in which the grain boundary portions thereof have a reaction activity higher than that of crystal portions. In prior art, terminal electrodes with excellent peel strength could not be obtained on such barium titanate ceramics with B characteristic.

Thus, various types of glasses that have heretofore been developed have respective advantages, but a glass making it possible to satisfy all of the requirements has not yet been obtained.

SUMMARY OF THE INVENTION

It is an object of the present invention to provide a conductive paste having all of the required characteristics, that is, containing no hazardous components such as lead or the like, having a good binder removal ability and sinterability even in firing in a temperature range of about 700–900° C. in a non-oxidizing atmosphere, making it possible to form a conductor with excellent characteristics with respect to density, resistance to plating solution, adhesive strength, resistance to thermal shocks, and the like, having small dependence on firing process conditions, and being capable of being fired in a wide temperature range, and also to provide a glass used in such a conductive paste. Yet another object of the present invention is to provide an excellent conductive paste especially suitable for forming terminal electrodes of multilayer ceramic capacitors. Still another object of the present invention is to provide a conductive paste causing no degradation of ceramic bodies and exhibiting an excellent adhesive strength with respect to a variety of dielectric ceramic bodies, in particular, when used for terminal electrodes of multilayer ceramic capacitors.

The present invention provides a glass containing no lead and comprising, calculated as oxides: 40–60 wt. % ZnO, 15–35 wt. % $B_2O_3$, 1–16 wt. % $SiO_2$, 1–10 wt. % $Al_2O_3$, 2–15 wt. % $MnO_2$, and at least one selected from the group consisting of $Li_2O$, $Na_2O$ and $K_2O$ in their total of 0.5–10 wt. %. The present invention also provides a glass containing no lead and comprising, calculated as oxides: 40–60 wt. % ZnO, 15–35 wt. % $B_2O_3$, 1–16 wt. % $SiO_2$, 1–10 wt. % $Al_2O_3$, 2–15 wt. % $MnO_2$, at least one selected from the group consisting of $Li_2O$, $Na_2O$ and $K_2O$ in their total of 0–5 wt. %, and at least one selected from the group consisting of MgO, CaO, $TiO_2$, $Cr_2O_3$, $ZrO_2$, $Ta_2O_5$, $SnO_2$, and $Fe_2O_3$ in their total of 0.1–5 wt. % (referred to hereinbelow as "the second glass of the present invention"). The present invention also provides a conductive paste comprising the above-specified glass and a conductive paste for forming terminal electrodes of multilayer ceramic components.

DETAILED DESCRIPTION OF THE PREFERRED EMBODIMENTS

The glass in accordance with the present invention is a zinc borosilicate crystallizable glass having a low softening point within a range of 500–700° C. and is characterized in that it forms a homogeneous glass in which firing hardly causes phase separation and in that it shows appropriate crystallization behavior and flow characteristic during firing a conductive paste containing such a glass. Using the glass in accordance with the present invention as an inorganic binder of a conductive paste not only makes it possible to obtain excellent characteristics of fired films, but also decreases dependence on firing temperature and allows the firing to be conducted within a wide temperature range.

Thus, regardless of its low softening temperature, good binder removal capability in a low-temperature range is obtained during firing the conductive paste. As a result, a dense conductor film with excellent strength, resistance to thermal shocks, and resistance to plating solutions and water can be formed without deteriorating the glass flowability, impeding sintering of metal powder, or causing property degradation, by residual carbon or the like. Further, because precipitated crystals suppress a sudden drop in glass viscosity and the glass does not move to the surface of conductor film by excess flowing even in a high-temperature region, occurrence of glass spots is prevented. Main precipitated crystals are supposed as $Zn_3B_2O_6$ which apparently precipitate mainly in the form of needles that are intertwined, producing a network structure in the film, and producing an effect of appropriately suppressing a flow of the glass.

The above glass component reacts with some of ceramic body components on the interface with the ceramic body, for example, of a capacitor and the reaction products penetrate into the dielectric. The presence of this reaction layer increases the adhesive strength of the electrodes and can prevent the occurrence of cracking in the ceramic body during plating or thermal shock test.

Further, the second glass of the present invention contains at least one component selected from among MgO, CaO, $TiO_2$, $Cr_2O_3$, $ZrO_2$, $Ta_2O_5$, $SnO_2$, and $Fe_2O_3$. When a conductive paste containing the second glass is applied to ceramics with F characteristic, the glass and ceramic body form a homogeneous reaction layer, whereas when the conductive paste is applied to ceramic bodies having portions with high reactivity, such as ceramic bodies made of ceramics with B characteristic, a terminal electrode with a high adhesive strength can be also formed without degrading the ceramic body strength. This is apparently because the glass comprising those components in specific quantities has lower crystallinity and reactivity than a glass containing no such components and the reaction with the grain boundary portions of the ceramic body and subsequent permeation into the ceramic body are suppressed appropriately. Therefore, terminal electrodes with a high adhesive strength and a high peel strength can be obtained regardless of the type of dielectric ceramic body.

The composition range of the glass in accordance with the present invention will be described below. In the description hereinbelow, the symbol % will represent percent by weight, unless stated otherwise.

ZnO forms a glass network in cooperation with $B_2O_3$ and also becomes a constituent of precipitated crystals. In addition, it improves adhesion strength with the substrate. The content outside the range of 40–60% is undesirable because softening point of the glass becomes too high. If the paste is fired at a high temperature in a non-oxidizing atmosphere, ZnO is usually easily sublimated and/or reduced under the effect of residual carbon. However, in accordance with the present invention, because the binder removal ability is very good, no such problem arises despite a high content of ZnO.

$B_2O_3$ is a network-forming oxide and also used as a flux. If the content thereof is less than 15%, the glass is devitrified, and if the content is above 35%, the chemical resistance of the glass decreases significantly. It is preferred that ZnO and $B_2O_3$ be mixed so the molar ratio thereof is 55:45–65:35.

$SiO_2$ is a network-forming oxide and produces an effect of expanding the vitrification range and an effect of improving chemical resistance. The content of more than 16% is undesirable because the softening point becomes too high. The preferred content is no more than 13%. It is desirable that the total content of $B_2O_3$ and $SiO_2$ be no more than 40 wt. %.

The drawback of the $ZnO-B_2O_3-SiO_2$ glass of the above-described composition is that phase separation easily occurs therein. $Al_2O_3$ prevents such phase separation so that a homogeneous glass can be formed. As a result, process dependency can be reduced. Furthermore, similarly to $SiO_2$, $Al_2O_3$ improves chemical resistance. If the content of $Al_2O_3$ is above 10%, softening point becomes too high and the glass is devitrified. The preferred content of $Al_2O_3$ is no more than 8%.

The Mn component is present in the glass with a valence of 2 or 3 and apparently has the following effect. In a non-oxidizing atmosphere the valence changes causing release of oxygen which is then bonded to residual carbon originating from the vehicle present in the paste and drive off it as $CO_2$ to the outside of the film. Further, the Mn component also effects an increase in the reactivity of the glass with metallic copper. If the mixing quantity is less than 2%, calculated as $MnO_2$ equivalent, the effect is small, and if it is more than 15%, the glass is devitirified in the production process and stable glass cannot be obtained. The preferred content is 2–10%.

At least one alkali metal oxide selected from among $Li_2O$, $Na_2O$, and $K_2O$ is a network-modifying oxide which decreases the softening temperature of the glass. If the content thereof exceeds 10%, the chemical resistance of the glass decreases significantly. This component also affects the precipitation of crystals and if the content is small, the crystals do not precipitate sufficiently. Further, the form of precipitated crystals can be changed by selecting the type of alkali metal oxide. When $Li_2O$ is used alone, needle crystals cannot be precipitated. Therefore, it is preferred that $Na_2O$ and/or $K_2O$ be used therewith. With certain compositions of dielectric used for the ceramic bodies, there is a risk of $Na_2O$ degrading the capacitor characteristic. In such cases, using $Na_2O$ should be avoided. However, sufficient water resistance is not obtained when $K_2O$ is used alone. Therefore, it is preferred that a combination of $Li_2O$ 0.1–3% and $K_2O$ 1–8% be employed. In the second glass of the present invention comprising at least one component selected from among MgO, CaO, $TiO_2$, $Cr_2O_3$, $ZrO_2$, $Ta_2O_5$, $SnO_2$, and $Fe_2O_3$, addition of the above-mentioned alkali metal oxides is not always required. Even when they are added, the total content is preferably within a range of 5% and below.

Introducing a small amount of a component selected from among MgO, CaO, $TiO_2$, $Cr_2O_3$, $ZrO_2$, $Ta_2O_5$, $SnO_2$, and $Fe_2O_3$ in the glass comprising the above-described components has an effect of changing the crystallization behavior and reactivity of the glass in the above-described manner and is especially effective in applications to ceramic bodies with B characteristic. The desired effect cannot be obtained if those components are outside the range of a total content of 0.1–5%.

The glass in accordance with the present invention can additionally contain small amounts of other oxides within ranges which do not affect properties of the glass.

The glass in accordance with the present invention can be produced by a usual method comprising mixing the starting material compounds of the respective components, melting, rapidly cooling, and grinding and also by other methods such as a sol-gel method, a spray pyrolysis method, an atomization method, and the like. It is especially preferred that the glass be produced by a spray pyrolysis method because fine spherical glass particles of uniform size can be obtained and it is not necessary to conduct grinding when using the glass for a conductive paste.

No specific limitation is placed on the electrically conductive powder used in the conductive paste in accordance with the present invention. Thus, powders of base metals such as copper, nickel, cobalt, iron, and the like which require firing to be conducted in a non-oxidizing atmosphere, powders of alloys or composite powders containing one or more of those metals, as well as electrically conductive powders of noble metals such as silver and palladium or alloys or composites containing one or more of these metals can be used. The above-mentioned conductive powders can be used singly or in combination of two or more thereof. No specific limitation is placed on the mixing ratio of the electrically conductive powder and glass powder, and this ratio can be appropriately adjusted within the usually used range according to the object and the intended use.

No specific limitation is also placed on the vehicle. Any vehicle prepared by dissolving or dispersing a resin binder that is usually employed, for example, an acrylic resin, cellulose, and the like, in an aqueous or organic solvent may be appropriately selected and used according to the object or intended use. If necessary, a plasticizer, a dispersant, a surfactant, an oxidizing agent, an organometallic compound, and the like can be added. No limitation is also placed on the mixing ratio of the vehicle, and the vehicle can be used in an appropriate amount allowing the inorganic components to be retained in the paste and depending on the intended use or coating method.

If necessary, metal oxides, ceramics, and the like which are usually used may be added as other inorganic binders or additives.

The conductive paste in accordance with the present invention is especially suitable for the formation of terminal electrodes of multilayer ceramic components, such as multilayer capacitors, multilayer inductors, and the like, but it can be also used for forming electrodes on other electronic components, for forming conductor layers on multilayer ceramic substrates, or for forming thick-film conductors on ceramic substrates, for example, from alumina or the like.

The present invention will be described hereinbelow in greater detail based on examples thereof.

EXAMPLE 1

Starting materials were prepared to obtain oxide compositions shown in Table 1, melted at a temperature of about 1150° C. in a platinum crucible, poured out onto graphite and air cooled to obtain a glass which was finely ground with alumina balls, to obtain glass powders A–K, X and Y. Powders X and Y are outside the range of the present invention. Glass transition temperature (Tg), softening point (Ts), and crystallization temperature (Tc) were measured by thermal analysis for each of glass powders. The results are shown in Table 1.

Water resistance was evaluated for each glass powder in the manner as follows. A vehicle prepared by dissolving an acrylic resin in terpineol was mixed with each glass powder to prepare a glass paste which was coated on an alumina substrate and fired at a temperature of 850° C. in a nitrogen atmosphere with an oxygen concentration of no more than 5 ppm to form a glass film. The sample obtained was immersed for 2 hours in pure water boiled at a temperature of 100° C., then removed therefrom, thoroughly washed with water, while being scrubbed with a brush, and dried, followed by measuring the film weight. The film residual ratio is shown in Table 1.

parts of a copper powder and mixing the components in a three-roll mill. The paste was then coated by a dipping method, so as to obtain a film thickness after firing of about 120 $\mu$m, on end surfaces of inner electrodes exposed from a fired ceramic body of a multilayer ceramic capacitor with a flat surface size of 3.2 mm×1.6 mm which had been prepared using, as a dielectric, a ceramic comprising barium titanate as a main component and having F characteristic specified by JIS and nickel as inner electrodes. Then multilayer ceramic capacitors with sample numbers of 1 to 12 were produced by drying each body for 10 minutes at a temperature of 150° C. in a hot-air drier, followed by firing for a total of 1 hour with a peak temperature retention time of 10 minutes at a peak temperature shown in Table 2 in a nitrogen atmosphere with an oxygen concentration of no more than 5 ppm by using a belt-type muffle furnace. Samples with numbers 11 and 12 are outside the range of the present invention.

Film density was studied for the obtained samples by observing the polished cross section of the terminal electrodes with a scanning electron microscope. The results are shown in Table 2. The following criteria were used for evaluation: ○—dense fired film without pores, Δ—film in which small amount of pores are observed, ×—other.

Further, a nickel plated film and a tin plated film were successively formed on the terminal electrode surface by electroplating and thermal shock resistance tests and measurements of adhesive strength and peel strength were conducted in the manner as follows. The results are shown in Table 2.

Thermal shock resistance test: each plated sample was rapidly immersed in a solder bath at a temperature of 300° C., retained therein for 7 seconds, removed, and naturally air

TABLE 1

| Glass Powder | | A | B | C | D | E | F | G | H | I | J | K | X* | Y* |
|---|---|---|---|---|---|---|---|---|---|---|---|---|---|---|
| Composition (wt. %) | ZnO | 48.0 | 48.0 | 48.0 | 48.0 | 48.0 | 48.0 | 47.5 | 48.0 | 48.0 | 48.0 | 48.0 | 20.0 | 63.7 |
| | $B_2O_3$ | 26.0 | 26.0 | 27.0 | 29.0 | 29.2 | 29.2 | 27.0 | 26.2 | 29.2 | 29.2 | 29.2 | 20.0 | 36.3 |
| | $SiO_2$ | 6.7 | 6.7 | 7.0 | 6.7 | 7.5 | 7.5 | 11.5 | 10.5 | 7.5 | 7.5 | 7.5 | 7.0 | — |
| | $Al_2O_3$ | 6.3 | 6.3 | 6.0 | 6.3 | 6.3 | 6.3 | 5.0 | 6.3 | 6.3 | 6.3 | 6.3 | 4.0 | — |
| | $MnO_2$ | 6.0 | 6.0 | 6.0 | 6.0 | 6.0 | 6.0 | 6.0 | 6.0 | 6.0 | 6.0 | 6.0 | 8.0 | — |
| | $Li_2O$ | 1.8 | 0.3 | — | — | — | — | — | — | — | — | — | — | — |
| | $Na_2O$ | — | — | 5.0 | — | — | — | — | — | — | — | — | — | — |
| | $K_2O$ | 5.2 | 6.7 | 1.0 | 7.0 | 2.0 | 2.0 | — | 2.0 | 2.0 | 2.0 | 2.0 | — | — |
| | MgO | — | — | — | — | 1.0 | — | — | — | — | — | — | — | — |
| | CaO | — | — | — | — | — | 1.0 | — | — | — | — | — | — | — |
| | $TiO_2$ | — | — | — | — | — | — | 2.0 | — | — | — | — | 4.0 | — |
| | $Cr_2O_3$ | — | — | — | — | — | — | 1.0 | 1.0 | — | — | — | — | — |
| | $ZrO_2$ | — | — | — | — | — | — | — | — | 1.0 | — | — | — | — |
| | $Ta_2O_5$ | — | — | — | — | — | — | — | — | — | 1.0 | — | — | — |
| | $SnO_2$ | — | — | — | — | — | — | — | — | — | — | 1.0 | — | — |
| | BaO | — | — | — | — | — | — | — | — | — | — | — | 31.0 | — |
| | $Cu_2O$ | — | — | — | — | — | — | — | — | — | — | — | 3.0 | — |
| | $Co_2O_3$ | — | — | — | — | — | — | — | — | — | — | — | 3.0 | — |
| Tg (° C.) | | 467 | 484 | 471 | 484 | 532 | 534 | 555 | 527 | 542 | 531 | 541 | 510 | 545 |
| Ts (° C.) | | 524 | 535 | 535 | 535 | 649 | 641 | 675 | 645 | 629 | 635 | 647 | 593 | 578 |
| Tc (° C.) | | 599/805 | 637/809 | 639/807 | 637/808 | 813 | 788 | 881 | 813 | 806 | 785 | 797 | 644 | 692 |
| Water Resistance (%) | | 98.4 | 85.6 | 95.4 | 42.3 | 97.2 | 94.5 | 97.1 | 96.0 | 96.3 | 96.0 | 96.8 | 54.8 | 72.0 |

*outside the range of the present invention

EXAMPLE 2

Conductive pastes were prepared in the following manner by using the glass powders produced in Example 1. Each conductive paste was produced by blending 12 weight parts of the glass powder and 40 weight parts of a vehicle in which an acrylic resin was dissolved in terpineol with 100 weight cooled. If cracks appeared on the ceramic surface of no more than one of 30 samples, symbol ○ was used, if cracks appeared in no less than two samples, symbol × was used.

Adhesive strength: lead wires were soldered to two opposing terminal electrodes so as to be perpendicular to the electrode surface, both lead wires were pulled in the opposite directions with a strength measurement device, and the values at which the electrode portions have broken were determined.

Peel strength: lead wires were soldered to two opposing terminal electrodes so as to be parallel to the electrode surface, both lead wires were pulled to the left and right by applying a force perpendicular to the electrode surface with a strength measurement device, and the values at which the electrode portions have broken were determined.

TABLE 2

| Sample No. | 1 | 2 | 3 | 4 | 5 | 6 | 7 | 8 | 9 | 10 | 11* | 12* |
|---|---|---|---|---|---|---|---|---|---|---|---|---|
| Glass Powder | A | A | A | B | C | D | E | F | H | I | X | Y |
| Firing Temperature (° C.) | 800 | 830 | 850 | 830 | 830 | 830 | 800 | 800 | 800 | 800 | 830 | 830 |
| Film Density | ○ | ○ | ○ | ○ | ○ | ○ | ○ | ○ | ○ | ○ | Δ | Δ |
| Thermal Shock Resistance | ○ | ○ | ○ | ○ | ○ | ○ | ○ | ○ | ○ | ○ | x | ○ |
| Adhesive Strength (kg) | 4.1 | 4.5 | 4.3 | 4.5 | 4.2 | 4.4 | 4.0 | 4.1 | 4.5 | 4.1 | 3.5 | 2.9 |
| Peel Strength (lbs) | 3.9 | 4.2 | 4.5 | 4.9 | 4.1 | 5.2 | 4.2 | 4.0 | 4.8 | 4.7 | 3.0 | 2.6 |

*Outside the range of the present invention

Table 2 clearly shows that the conductive paste using the glass in accordance with the present invention had excellent film density, high resistance to thermal shocks, and high adhesive strength and also demonstrated practically no changes in characteristics caused by firing temperature.

EXAMPLE 3

Using glass powders E–K, A, X produced in Example 1, conductive pastes were prepared in the same manner as in Example 2. Each paste was then coated by a dipping method, so as to obtain a film thickness after firing of about 120 μm, on end surfaces of inner electrodes exposed from a fired ceramic body of a multilayer capacitor ceramic body with a flat surface size of 2.0 mm×1.25 mm which had been prepared using, as a dielectric, a ceramic comprising barium titanate as a main component and having B characteristic specified by JIS standard and nickel as inner electrodes. Then multilayer ceramic capacitors with sample numbers of 13 to 21 were produced by drying each body for 10 minutes at a temperature of 150° C. in a hot-air drier, followed by firing for a total of 1 hour with a peak temperature retention time of 10 minutes at a peak temperature of 800° C. in a nitrogen atmosphere with an oxygen concentration of no more than 5 ppm by using a belt-type muffle furnace. The sample with numbers 21 is outside the range of the present invention.

The film density, thermal shock resistance, adhesive strength, and peel strength of the terminal electrode were studied in the same manner as in Example 2 for each of the obtained samples. The results are shown in Table 3. In all of the samples, the fracture mode in the peel strength measurement was cracking or fracturing of the ceramic body.

TABLE 3

| Sample No. | 13 | 14 | 15 | 16 | 17 | 18 | 19 | 20 | 21* |
|---|---|---|---|---|---|---|---|---|---|
| Glass Powder | E | F | G | H | I | J | K | A | X |
| Film Density | ○ | ○ | ○ | ○ | ○ | ○ | ○ | ○ | Δ |
| Thermal Shock Resistance | ○ | ○ | ○ | ○ | ○ | ○ | ○ | ○ | x |
| Adhesive Strength (kg) | 4.1 | 4.3 | 4.5 | 4.8 | 4.7 | 3.8 | 4.7 | 3.9 | 2.4 |
| Peel Strength (lbs) | 1.3 | 1.2 | 1.6 | 1.5 | 1.4 | 1.2 | 1.4 | 0.7 | 0.3 |

*outside the range of the present invention

As shown in Table 3, the conductive paste using the second glass of the present invention demonstrated excellent adhesive strength and peel strength even with respect to a ceramic body of a ceramic dielectric with B characteristic.

The glass in accordance with the present invention has a low softening point, contains no hazardous components such as lead and the like, and demonstrates appropriate viscosity characteristic and crystallization behavior in a firing process. With a conductive paste using such a glass as an inorganic binder, organic components can be completely removed and a dense conductor with excellent resistance to plating solutions, adhesive strength, resistance to thermal shocks, and reliability can be produced even in case of firing in a non-oxidizing atmosphere. Furthermore, the paste shows little dependence of firing process conditions and electrodes with excellent and uniform characteristics can be formed even in firing within a wide temperature range. Moreover, when the paste is used for forming terminal electrodes of multilayer ceramic components, a high terminal strength and peel strength are obtained regardless of the type of ceramic body and ceramic components with high reliability can be obtained.

What is claimed is:

1. A glass containing no lead and comprising, calculated as oxides, 40–60 wt. % ZnO, 15–35 wt. % $B_2O_3$, 1–16 wt. % $SiO_2$, 1–10 wt. % $Al_2O_3$, 2–15 wt. % $MnO_2$, and at least one selected from the group consisting of $Li_2O$, $Na_2O$ and $K_2O$ in their total of 0.5–10 wt. %.

2. A glass containing no lead and comprising, calculated as oxides, 40–60 wt. % ZnO, 15–35 wt. % $B_2O_3$, 1–16 wt. % $SiO_2$, 1–10 wt. % $Al_2O_3$, 2–15 wt. % $MnO_2$, at least one selected from the group consisting of $Li_2O$, $Na_2O$ and $K_2O$ in their total of 0–5 wt. %, and at least one selected from the group consisting of MgO, CaO, $TiO_2$, $Cr_2O_3$, $ZrO_2$, $Ta_2O_5$, $SnO_2$, and $Fe_2O_3$ in their total of 0.1–5 wt. %.

3. A conductive paste comprising an electrically conductive powder, a vehicle, and a powder of the glass claimed in claim 1.

4. A conductive paste comprising an electrically conductive powder, a vehicle, and a powder of the glass claimed in claim 2.

5. The conductive paste according to claim 3, wherein the electrically conductive powder comprises at least one powder selected from the group consisting of powders of copper, nickel, cobalt and an alloy or composite containing at least one of these metals.

6. The conductive paste according to claim 4, wherein the electrically conductive powder comprises at least one powder selected from the group consisting of powders of copper, nickel, cobalt and an alloy or composite containing at least one of these metals.

7. The conductive paste according to claim 3, wherein the electrically conductive powder comprises at least one powder selected from the group consisting of powders of silver, palladium, and an alloy or composite containing at least one of these metals.

8. The conductive paste according to claim 4, wherein the electrically conductive powder comprises at least one powder selected from the group consisting of powders of silver, palladium, and an alloy or composite containing at least one of these metals.

9. A conductive paste for forming a terminal electrode of a multilayer ceramic component, wherein the conductive paste is according to claim 3.

10. A conductive paste for forming a terminal electrode of a multilayer ceramic component, wherein the conductive paste is according to claim 4.

11. The conductive paste according to claim 9, wherein the electrically conductive powder comprises at least one powder selected from the group consisting of powders of copper, nickel, cobalt and an alloy or composite containing at least one of these metals.

12. The conductive paste according to claim 10, wherein the electrically conductive powder comprises at least one powder selected from the group consisting of powders of copper, nickel, cobalt and an alloy or composite containing at least one of these metals.

13. The conductive paste according to claim 9, wherein the electrically conductive powder comprises at least one powder selected from the group consisting of powders of silver, palladium, and an alloy or composite containing at least one of these metals.

14. The conductive paste according to claim 10, wherein the electrically conductive powder comprises at least one powder selected from the group consisting of powders of silver, palladium, and an alloy or composite containing at least one of these metals.

* * * * *